United States Patent
Tyson et al.

(10) Patent No.: US 8,645,290 B2
(45) Date of Patent: Feb. 4, 2014

(54) APPARATUS AND METHOD FOR IMPROVED CLASSIFIER TRAINING

(75) Inventors: Mabry W. Tyson, Los Altos, CA (US); Douglas E. Appelt, Palo Alto, CA (US); Min Yin, San Jose, CA (US); Yasmina Chitti, San Mateo, CA (US)

(73) Assignee: SRI International, Menlo Park, CA (US)

( * ) Notice: Subject to any disclaimer, the term of this patent is extended or adjusted under 35 U.S.C. 154(b) by 300 days.

(21) Appl. No.: 13/118,248

(22) Filed: May 27, 2011

(65) Prior Publication Data

US 2011/0295781 A1  Dec. 1, 2011

Related U.S. Application Data

(60) Provisional application No. 61/349,630, filed on May 28, 2010.

(51) Int. Cl.
*G06N 5/00*   (2006.01)

(52) U.S. Cl.
USPC .............................................. 706/12; 706/45

(58) Field of Classification Search
USPC ...................................................... 706/12, 45
See application file for complete search history.

(56) References Cited

PUBLICATIONS

Cazzanti, Generative Models for Similarity-based Classification, Doctoral Thesis, University of Washington, 2007, pp. 1-122.*
Mellouk, et al., Machine Learning, In-Teh, 2009, pp. 1-430.*

* cited by examiner

*Primary Examiner* — Wilbert L Starks
(74) *Attorney, Agent, or Firm* — Cooley LLP

(57) ABSTRACT

A non-transitory computer readable storage medium includes instructions to maintain an original training set of labeled documents, where the labeled documents correspond to a variety of topics. A new labeled document corresponding to a new topic is received. The original training set of labeled documents is modulated such that the new labeled document is over-represented with respect to the original training set. This results in a modulated training set. A classifier is trained with the modulated training set to form a trained classifier.

6 Claims, 2 Drawing Sheets

APPARATUS AND METHOD FOR IMPROVED CLASSIFIER TRAINING

CROSS-REFERENCE TO RELATED APPLICATION

This application claims priority to U.S. Provisional Patent Application 61/349,630, filed May 28, 2010, the contents of which are incorporated herein.

STATEMENT REGARDING FEDERALLY SPONSORED RESEARCH OR DEVELOPMENT

This invention was made with government support under contract number FA8750-09-D-0183 awarded by the United States Government: Air Force Research Laboratory. The Government has certain rights in this invention.

FIELD OF THE INVENTION

This invention relates generally to machine learning. More particularly, this invention relates to improved techniques for training a machine learning classifier.

BACKGROUND OF THE INVENTION

Machine learning is a scientific discipline directed toward the design and development of algorithms that allow computers to improve judgment. For example, a system can take advantage of examples (data) to capture characteristics of interest. Data can be seen as examples that illustrate relations between observed variables. A major focus of machine learning research is to automatically learn to recognize complex patterns and make intelligent decisions based on data; the difficulty lies in the fact that the set of all possible behaviors given all possible inputs is too large to be covered by the set of observed examples (training data). Hence the learner must generalize from the given examples, so as to be able to produce a useful output in new cases.

Statistical classification utilizes a training set of data containing known observations for a sub-population to identify the sub-population to which new observations belong. Executable instructions in the form of a classifier perform these operations. New individual items are placed into groups by the classifier based upon quantitative information on one or more measurements, traits or characteristics established by the training set.

In contrast, cluster analysis evaluates a single data set to decide how and whether the observations in the data set can be divided into groups. Clustering is known as unsupervised learning, while classification is known as supervised learning.

A problem arises when a previously unused label is introduced. In this case, there is no a priori set of labeled examples. Training examples for supervised learning are necessary. Consequently, there is a need to minimize the inconvenience of selecting training examples, while maximizing the benefit of the selected training examples.

SUMMARY OF THE INVENTION

A non-transitory computer readable storage medium includes instructions to maintain an original training set of labeled documents, where the labeled documents correspond to a variety of topics. A new labeled document corresponding to a new topic is received. The original training set of labeled documents is modulated such that the new labeled document is over-represented with respect to the original training set. This results in a modulated training set. A classifier is trained with the modulated training set to form a trained classifier.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
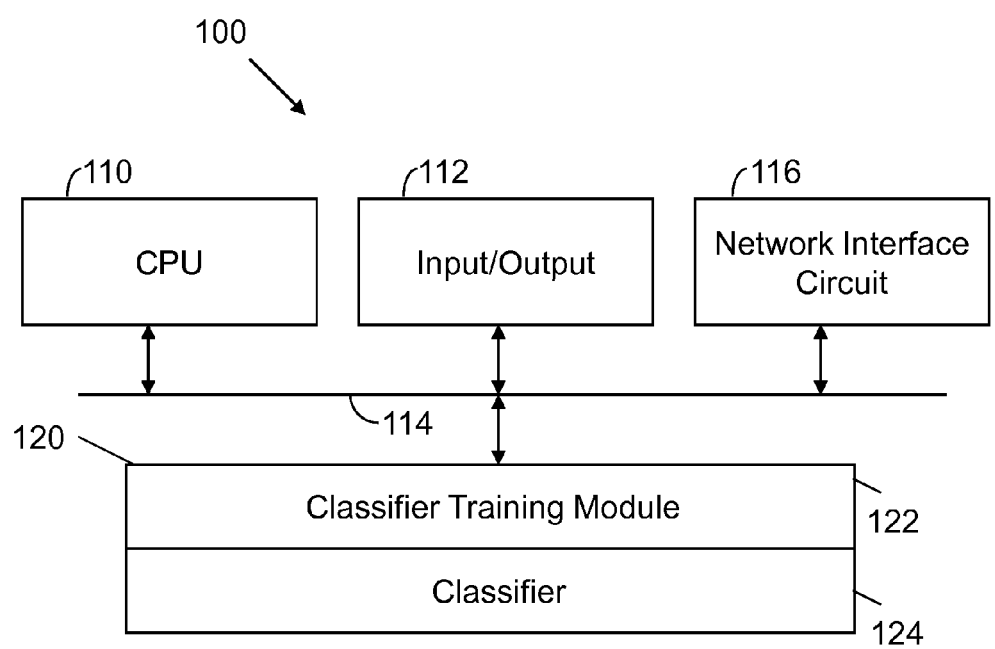
FIG. 1 illustrates a computer configured in accordance with an embodiment of the invention.

FIG. 1 illustrates a computer 100 configured in accordance with an embodiment of the invention. The computer 100 includes standard components, such as a central processing unit 110 and input/output devices 112 connected via a bus 114. The input/output devices 112 may include a keyboard, mouse, touch display and the like. A network interface circuit 116 is also connected to the bus 114 to provide connectivity to a network (not shown).

A memory 120 is also connected to the bus 114. The memory 120 includes executable instructions to implement operations of the invention. In one embodiment, a classifier training module 122 includes instructions to select an optimized training set of labeled documents for processing by the classifier 124.

Consider the case of a stream of input documents and a collection "C" of already received documents. The collection is ordered by some criteria named "R", such as most recent first. A set of labels called "topics" is declared. Documents are to be labeled with at most one topic. Documents with no labels are referred to as being in the pseudo-topic "Other." Specified criteria is used to judge whether a document is properly labeled by a topic. Furthermore, documents are marked as relevant or not, where relevance is judged separately within each topic.

Figure 2:
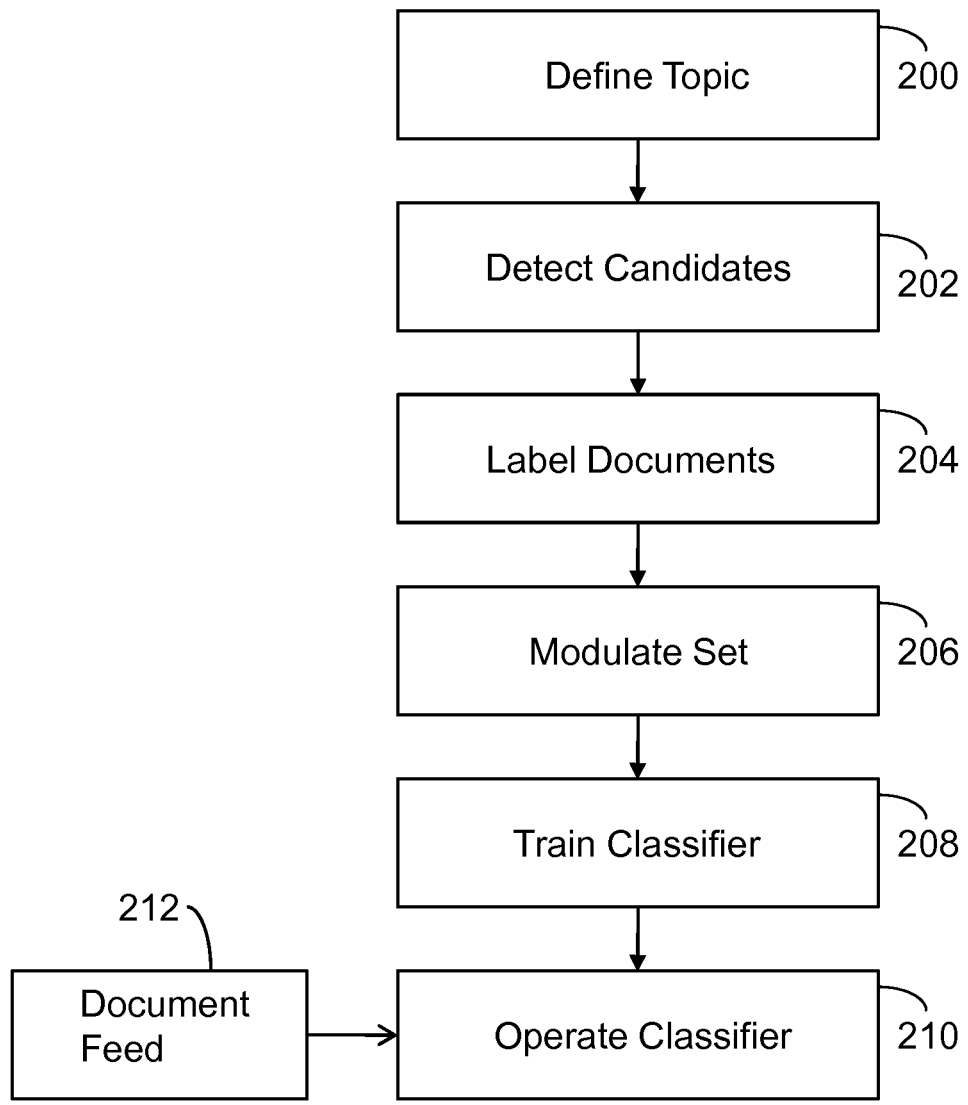
FIG. 2 illustrates processing operations associated with an embodiment of the invention.

FIG. 2 illustrates processing operations implemented by computer 100. The first processing operation of FIG. 2 is to define topics. To define a topic, the topic is given a name. Features (e.g., keywords) are used to identify potential documents for a topic. The purpose of the keywords is to identify a subset of the samples that is dense in the topic. The presence of keywords in a document is neither necessary nor sufficient for the document to be in the topic.

Next, candidate documents are detected 202. For example, the classifier 124 searches the collection "C" based on the features given plus any other features deemed significant (e.g., most recent first, source, . . . ). Unlike traditional search, the results to the user are designed to expose the greatest range of possible learning with an enforced diversity of sources, content types, and taxonomic distance between the results, as well as the best possible matches against variable interpretations of the user's criteria "K". The criteria should weigh heavily on the keyword features to match a user's expectation that the keywords have a significant role in the document, indicating a higher chance that the document should be labeled by the topic.

For an example of criteria "K", the set of N highest ranked (by criteria "R", including diversity and taxonomic weighting) documents in the collection "C" may be searched for the appearance of one or more keywords. These documents may then be further weighted by proximity to the original query. If insufficient documents were collected, N can be increased and the process repeated.

Next, the candidate documents are labeled 204. If labeled with the new topic, a separate evaluation is made of the relevance of the document to the topic.

At this point, the system has labeled examples for newly defined topics, plus labeled examples for previous topics (including those labeled examples from when they were defined plus any subsequent labeling through supervised learning). If the system were to use all its labeled examples for training, there would be a disproportionate number of examples of older topics. A classifier for topics trained with this full set would likely label more inputs with the older topics (more examples) and fewer with the new topic (fewer examples). This total set of labeled examples is not representative of the full sample set or of the expected mix of newly arriving inputs.

Thus, in accordance with the invention, the labeled set of documents is modulated 206. To create a representative labeled set, the system trains for topic recognition on the labeled documents within a training window of input documents. A number "labeled training window" (LTW) is chosen. The collection "C" is ordered according to the criteria "R". In that order, the top labeled samples are collected until there are LTW labeled samples. The position of the last labeled sample chosen will be called "The Training Window." (For example, if LTW=100, and the 100th labeled sample is found at position 250 in the collected documents, the training window is 250.)

This method of choosing labeled examples is approximately representative of the set of inputs. New topics may still be underrepresented. For instance, there might be 120 documents of the new topic in the training window, but only 40 are labeled. The LTW should be approximately the number of topics times the smallest number of labeled examples for one topic.

The relative frequency of the topics may vary so much that some topics may have very few or no labeled examples in the training window. If there are two topics, one of which occurs 100 times more frequently than the other, and each has 40 labeled examples, then it is unlikely that there will be any labeled examples of the rare topic in the training window for LTW=2×40=80. To compensate for this, the training window may be increased in either of two ways:

(1) The size of the training window may be increased until a minimum number of labeled examples occur in the training window.

(2) Alternatively, for any topic that has less than a minimum number of labeled examples, additional examples for that topic are added as if the training window were increased just for that topic.

Either of those adjustments distort the training set, so it is no longer perfectly representative of the inputs, but the results are likely better than if the topic is underrepresented. Based on this training set, a classifier for topic identification is created.

The training for detecting relevance within each topic does not use a training window. The training for each classifier for relevance (one per topic) uses all the available labeled examples up to a limit, as ordered by criteria "R".

The modulated labeled set is now used to train the classifier 208. Thereafter, the classifier can be operated 210 to process a document feed 212. After classification by topic, the system uses the appropriate relevance classifier to determine whether a document is relevant within the topic.

If a user implicitly or explicitly gives feedback for the topic or relevance, this feedback is recorded and treated as supervised training. Whenever the system retrains the classifiers, this supervised training is used as part of the labeled samples. The system again normalizes the labeled set into a training set before training new classifiers.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising instructions to:
   maintain an original training set of labeled documents, wherein the labeled documents correspond to a plurality of topics;
   receive a new labeled document corresponding to a new topic;
   modulate the original training set of labeled documents such that the new labeled document is over-represented with respect to the original training set to form a modulated training set, such that older topics with more examples are not over-represented with respect to the new labeled document; and
   train a classifier with the modulated training set to form a trained classifier.

2. The non-transitory computer readable storage medium of claim 1 wherein the instructions to modulate include instructions to require a minimum number of labeled documents corresponding to the new topic.

3. The non-transitory computer readable storage medium of claim 1 further comprising executable instructions to apply documents to the trained classifier.

4. The non-transitory computer readable storage medium of claim 1 wherein the instructions to modulate include instructions to form a labeled training window with a size corresponding to the number of topics times the smallest number of labeled examples for one topic.

5. The non-transitory computer readable storage medium of claim 4 further comprising instructions to increase the labeled training window size until a minimum number of labeled examples occur in the labeled training window size.

6. The non-transitory computer readable storage medium of claim 4 further comprising instructions to increase the labeled training window size such that for any topic that has less than a minimum number of labeled examples, additional examples for that topic are added as if the training window were increased just for that topic.

* * * * *